(12) United States Patent
Eikenberry et al.

(10) Patent No.: US 9,995,882 B2
(45) Date of Patent: Jun. 12, 2018

(54) PHOTONIC SYNTHESIS OF LARGE APERTURE TELESCOPES FROM MULTI-TELESCOPE ARRAYS

(71) Applicant: University of Florida Research Foundation, Inc., Gainesville, FL (US)

(72) Inventors: Stephen Scott Eikenberry, Gainesville, FL (US); Hipatia V. Donoso, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days. days.

(21) Appl. No.: 15/109,298

(22) PCT Filed: Feb. 4, 2015

(86) PCT No.: PCT/US2015/014495
§ 371 (c)(1),
(2) Date: Jun. 30, 2016

(87) PCT Pub. No.: WO2015/120074
PCT Pub. Date: Aug. 13, 2015

(65) Prior Publication Data
US 2016/0334582 A1    Nov. 17, 2016

Related U.S. Application Data

(60) Provisional application No. 61/935,531, filed on Feb. 4, 2014.

(51) Int. Cl.
*G02B 6/26*    (2006.01)
*G02B 6/35*    (2006.01)
(Continued)

(52) U.S. Cl.
CPC .............. *G02B 6/3512* (2013.01); *G02B 6/06* (2013.01); *G02B 23/04* (2013.01); *G02B 6/3548* (2013.01);
(Continued)

(58) Field of Classification Search
USPC ..................................... 385/18, 119
See application file for complete search history.

(56) References Cited

U.S. PATENT DOCUMENTS 5,108,168 A    4/1992    Norbert et al.
5,477,383 A    12/1995    Jain
(Continued)

FOREIGN PATENT DOCUMENTS

CN    102023389 B    7/2012
JP    2003-124883 A    4/2003
WO    WO 2013/176732 A1    11/2013

OTHER PUBLICATIONS

International Preliminary Examining Authority, International Preliminary Report on Patentability for International Application No. PCT/US2015/014495, dated May 23, 2016, 10 pages, Korean Intellectual Property Office, Republic of Korea.
(Continued)

*Primary Examiner* — Eric Wong
(74) *Attorney, Agent, or Firm* — Alston & Bird LLP (57) ABSTRACT

The present invention provides a telescope array and related components and methods. In various embodiments, the telescope array may include a plurality of telescopes, each telescope associated with a focal plane package and a telescope control system configured to control the focus and tracking of the telescope, such that each telescope may be independently focused and pointed. The focal plane package may comprise an optical fiber feed configured to provide a an optical signal to an optical fiber; and a mirror array
(Continued)

configured to provide two shifted simultaneous signals to an image capture device. The telescope array may further comprise at least one switchable multi-fiber coupler configured to couple the signals of at least some of the plurality of telescopes and an array control system in communication with each of the telescope control systems.

23 Claims, 8 Drawing Sheets

(51) Int. Cl.
    *G02B 23/04*     (2006.01)
    *G02B 6/06*     (2006.01)
    *G02B 6/36*     (2006.01)
    *G02B 6/38*     (2006.01)

(52) U.S. Cl.
    CPC .......... *G02B 6/3574* (2013.01); *G02B 6/3624* (2013.01); *G02B 6/3644* (2013.01); *G02B 6/3822* (2013.01)

(56) References Cited

U.S. PATENT DOCUMENTS

| | | | |
|---|---|---|---|
| 6,185,037 | B1 | 2/2001 | Lutz et al. |
| 6,225,619 | B1* | 5/2001 | Rhoads ................. G02B 26/06 250/203.4 |
| 2003/0034432 | A1 | 2/2003 | Presby et al. |
| 2006/0291773 | A1* | 12/2006 | Wu ...................... G02B 6/2931 385/18 |
| 2008/0044146 | A1* | 2/2008 | Weisser .................. G02B 6/06 385/119 |
| 2009/0040519 | A1* | 2/2009 | Zhang ...................... G01J 3/02 356/326 |
| 2009/0244700 | A1 | 10/2009 | Meyers et al. |
| 2017/0184834 | A1* | 6/2017 | Wolleschensky .... G02B 21/361 |

OTHER PUBLICATIONS

International Searching Authority, International Search Report and Written Opinion for Application No. PCT/US2015/014495, dated May 19, 2015, 16 pages, Korean Intellectual Property Office, Republic of Korea.

* cited by examiner

PHOTONIC SYNTHESIS OF LARGE APERTURE TELESCOPES FROM MULTI-TELESCOPE ARRAYS

CROSS REFERENCE TO RELATED APPLICATION

This application is a National Stage Application, filed under 35 U.S.C. § 371, of International Application No. PCT/US2015/014495, filed Feb. 4, 2015, which claims priority to U.S. Provisional Application No. 61/935,531, filed Feb. 4, 2014, the contents of which are hereby incorporated by reference in their entireties.

BACKGROUND

Embodiments of the present invention discussed herein are related to a telescope array. In particular, some embodiments of the present invention relate to photonic synthesis of large aperture telescopes formed from multi-telescope arrays.

The aperture of a telescope directly relates to the amount of light of collected by the telescope and the resolution of the telescope. However, large aperture telescopes are technically difficult to build and expensive. Generally, researchers must form large research collaborations to afford access to telescopes with sufficient apertures to perform desired observations.

Thus, a need exists for methods, systems, and apparatus that provide the benefits of a large aperture telescope but at an affordable price.

BRIEF SUMMARY

Embodiments of the present invention provide methods, systems, and apparatus for a cost effective large aperture telescope via a photonic synthesis telescope array. Embodiments of the present invention relate to spectroscopic measurements, high time-resolution measurements, and/or the like. For example, embodiments of the present invention may be used in transient spectroscopy and/or synoptic monitoring spectroscopy, precision radial velocity measurements, spectropolarimetry, time domain studies, atmospheric sensing (e.g., LiDAR observations), satellite spectroscopy, polarimetry, and laser ranging for intelligence applications.

In one aspect of the present invention, a switchable multi-fiber coupler is provided. In various embodiments, the switchable multi-fiber coupler may comprise an input optical fiber configured to provide an input signal; at least two output optical fibers each configured to provide an output signal; and at least one optical component configured to selectably provide the input signal to at least one of the output optical fibers.

In another aspect of the present invention, a focal plane package is provided. In various embodiments, the focal plane package may comprise an optical fiber feed configured to provide a an optical signal to an optical fiber; and a mirror array configured to provide two shifted simultaneous signals to an image capture device.

In still another aspect of the present invention, a telescope array is provided. In various embodiments, the telescope array may comprise a plurality of telescopes, each telescope associated with a focal plane package and a telescope control system configured to control the focus and tracking of the telescope, such that each telescope may be independently focused and pointed. The focal plane package may comprise an optical fiber feed configured to provide a an optical signal to an optical fiber; and a mirror array configured to provide two shifted simultaneous signals to an image capture device. The telescope array may further comprise at least one switchable multi-fiber coupler configured to couple the signals of at least some of the plurality of telescopes. The switchable multi-fiber coupler may comprise an input optical fiber configured to provide an input signal; at least two output optical fibers each configured to provide an output signal; and at least one optical component configured to selectably provide the input signal to at least one of the output optical fibers. The telescope array may further comprise an array control system in communication with each of the telescope control systems.

In yet another aspect of the present invention, a method for coupling a plurality of telescopes into a telescope array is provided. In various embodiments, the method may comprise providing a plurality of telescopes wherein each telescope is associated with a focal plane package and a telescope control system configured to the control the focus and tracking of the telescope such that each telescope may be independently focused and pointed. The focal plane package may comprise an optical fiber feed configured to provide a an optical signal to an optical fiber; and a mirror array configured to provide two shifted simultaneous signals to an image capture device. The method may further comprise coupling the signal from at least some of the telescopes via a switchable multi-fiber coupler. The switchable multi-fiber coupler may comprise an input optical fiber configured to provide an input signal; at least two output optical fibers each configured to provide an output signal; and at least one optical component configured to selectably provide the input signal to at least one of the output optical fibers.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF VARIOUS EMBODIMENTS

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

I. Module Architecture

Figure 1:
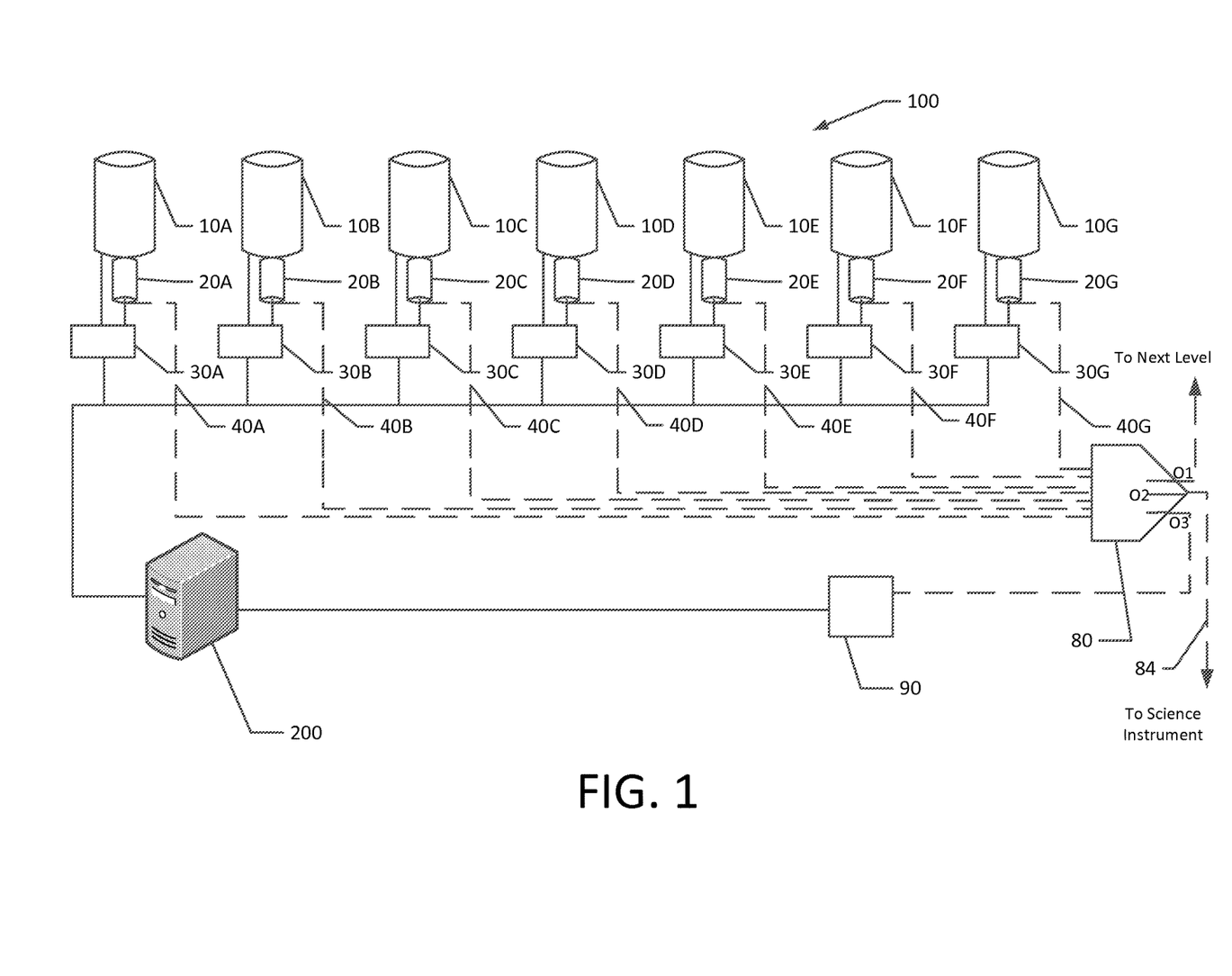
FIG. 1 is a schematic diagram of a one module array, in accordance with an embodiment of the present invention.

FIG. 1 illustrates an embodiment of a single telescope array module 100. The module 100 includes seven telescopes 10A-10G. In various embodiments, an array module may contain more or less than seven telescopes. Each telescope 10 (e.g., 10A-10G) is in communication with a focal plane package 20 (e.g., 20A-20G) and a telescope control system 30 (e.g., 30A-30G). As indicated by the solid lines, each telescope control system 30 is in communication with an array control system 200 via one or more wired or wireless networks. The dashed lines indicate optical fiber connections. For example, each focal plane package 20 is connected to a switchable multi-fiber coupler 80 via an optical fiber 40 (e.g., 40A-40G). The switchable multi-fiber coupler 80 is configured to combine the beams collected by each telescope 10A-10G into a single beam.

The switchable multi-fiber coupler 80 is configured to provide three output options. When output option O1 is selected via the switchable multi-fiber coupler 80, the combined beam is provided to another switchable multi-fiber coupler 80 such that the combined beam may be combined with other combined beams from other modules to provide a super-combined beam. When output option O2 is selected via the switchable multi-fiber coupler 80, the combined beam is provided to a scientific detector unit (e.g., a spectrograph, a high time-resolution detector, polarimeter, and/or other detector unit). When output option O3 is selected via the switchable multi-fiber coupler 80, the combined beam is provided to power meter 90. The power meter 90 may be configured to provide a measurement of the power in the combined beam to the array control system 200. Various components of a module of the telescope array will be discussed in more detail below. In various embodiments, at least some of the components of one or more modules of the telescope array may be commercial off-the-shelf components.

A. Telescope 10

The telescope 10 (e.g., 10A-10G) may be any of a variety of telescopes. In one embodiment, the telescope 10 is a standard system available as a commercial off the shelf system. For example, the telescope 10 may be an LX-200 series available from Meade Corporation. The telescope 10 may include an automated alignment system with GPS technology or other location determining technology. The telescope may be configured to collect a beam from a target source, track the target source across the sky, and/or the like. In various embodiments, all the telescopes 10 within a module 100 are identical (e.g., the same make and model). In other embodiments, the telescopes within a module 100 may not be identical.

As illustrated in FIG. 1, in various embodiments, a module may comprise seven telescopes 10A-10G. Other embodiments may include more than seven or less than seven telescopes 10 in each module. In some embodiments, all of the telescopes 10A-10G will be similar telescopes. In some embodiments, telescopes 10A-10G need not be the same telescope.

B. Focal Plane Package 20

Figure 2:
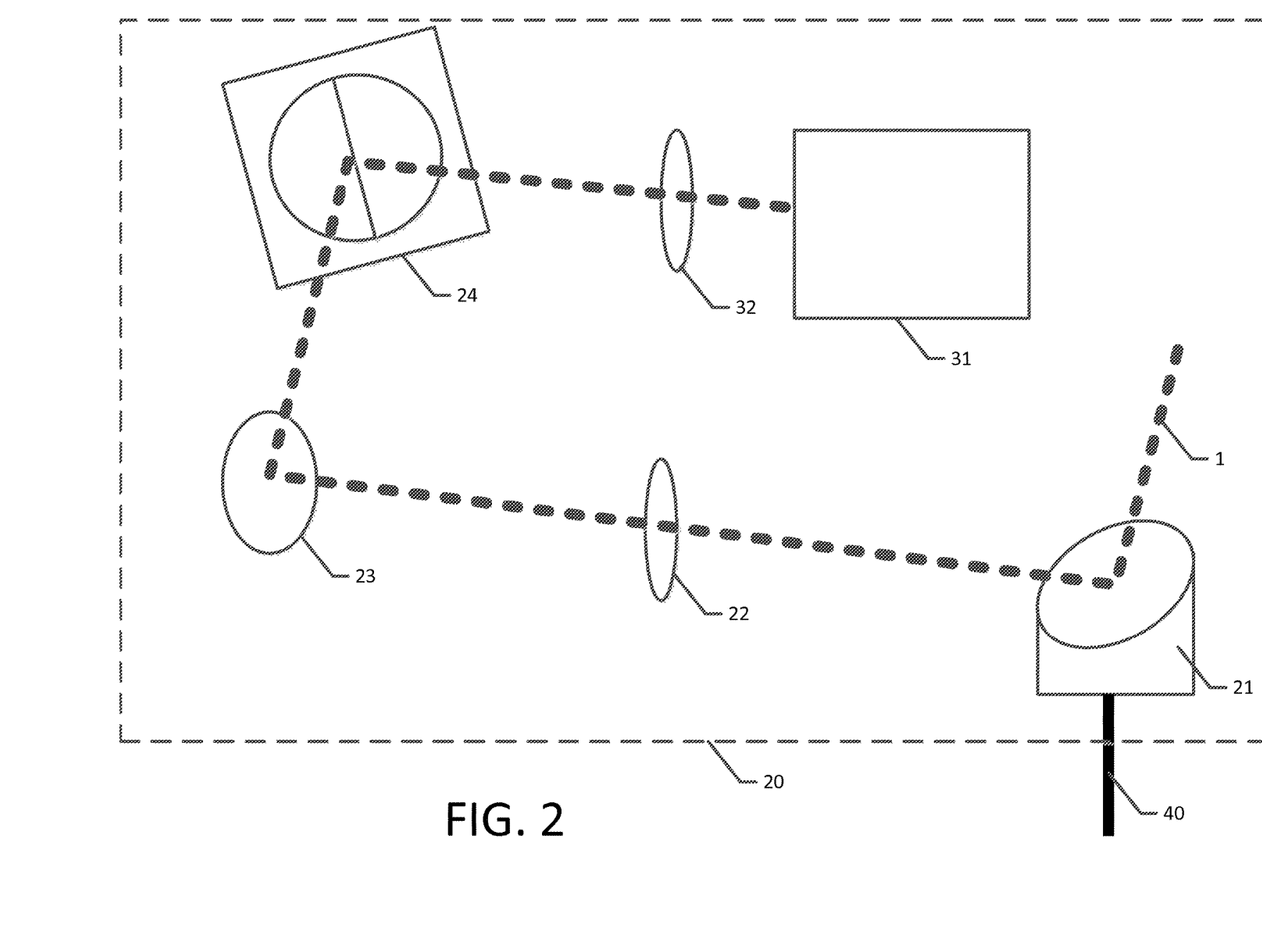
FIG. 2 is a schematic diagram of a focal plane package, in accordance with an embodiment of the present invention.

In various embodiments, the focal plan package 20 (e.g., 20A-20G) may be configured to provide a signal, via a fiber-optic feed, to the switchable multi-fiber coupler 80 and to provide a signal to the telescope control system 30 (e.g., 30A-30G). An example focal plane package is illustrated in FIG. 2. The focal plane package 20 (e.g., 20A-20G) includes a microfocuser, fiber-optic feed 21, 21', a Hartman mirror array 24 configured to provide source images to an acquisition and guidance system camera 31, and/or other optical components (e.g., lenses 22 and 32, mirror 23). The microfocuser (not shown) attaches to the telescope output port. The microfocuser may be configured to condition the incoming beam 1 before the beam 1 interacts with the remainder of the focal plane package 20. In various embodiments, the microfocuser is configured to focus the light from the telescope onto the fiber-optic feed 21. In one embodiment, the microfocuser may be a Meade Zero Image-Shift Microfocuser.

Figure 3A:
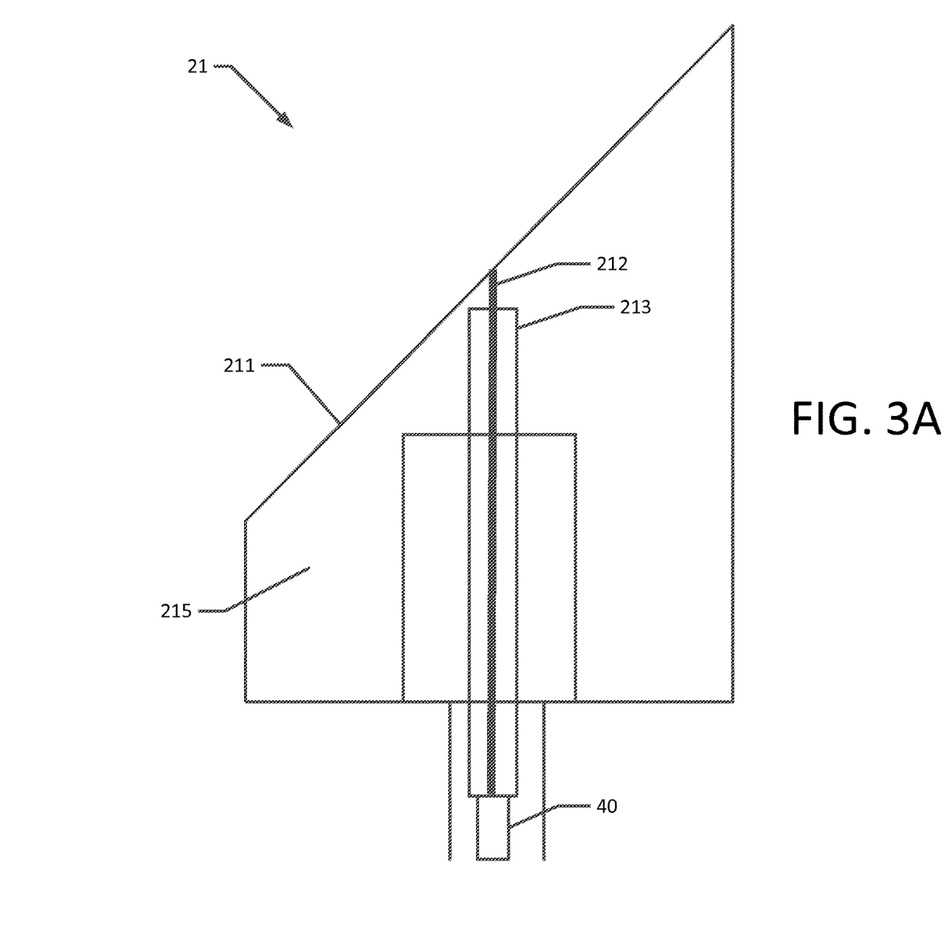
FIGS. 3A and 3B are schematic diagrams of fiber-optic feeds, each in accordance with an embodiment of the present invention.

The fiber-optic feed 21, 21' is configured to capture at least a portion of the beam 1 to an optical fiber. FIG. 3A shows an illustrative embodiment of a fiber-optic feed 21. In the illustrated embodiment, the fiber-optic feed 21 consists of a mirrored surface 211 (e.g., a reflective fold mirror) integrated with a fiber-optic cable connector 213. The mirror substrate 215 is configured to support the mirrored surface 211. In some embodiments, the mirror substrate 215 is metal (e.g., aluminum) or made of a polymeric material (e.g., plastic) with an optical-quality (e.g., diamond-turned with sputtered aluminum coating) mirrored surface 211 large enough to accommodate the entire acquisition and guidance system field of view through the telescope. In one embodiment, the mirror substrate 215 may be a printed by a 3D printer. In another embodiment, the mirror 211, 215 can be machined from a single piece, including a connector fixture for standard fiber connectors. For example, optical fiber 212 may be embedded within a connector 213 such as a ceramic ferrule. The connector 213 extends part of the way through the mirror substrate 215. The optical fiber 212 penetrates the final portion of the mirror substrate 215 between the end of the fiber optic cable connector 213 and the focal plane of the mirrored surface 211. In various embodiments, optical fiber 212 may be a bare fiber, a bare fiber with cladding, and/or a bare fiber with coating. The end of optical fiber 212 is embedded into the mirrored surface 211 such that the optical fiber 212 captures the central portion of the beam 1 that may correspond to the portion of the beam carrying the image of the target source. The optical fiber 212 may provide the captured central portion of the beam 1 to optical fiber 40 (e.g., 40A-40G).

Figure 3B:
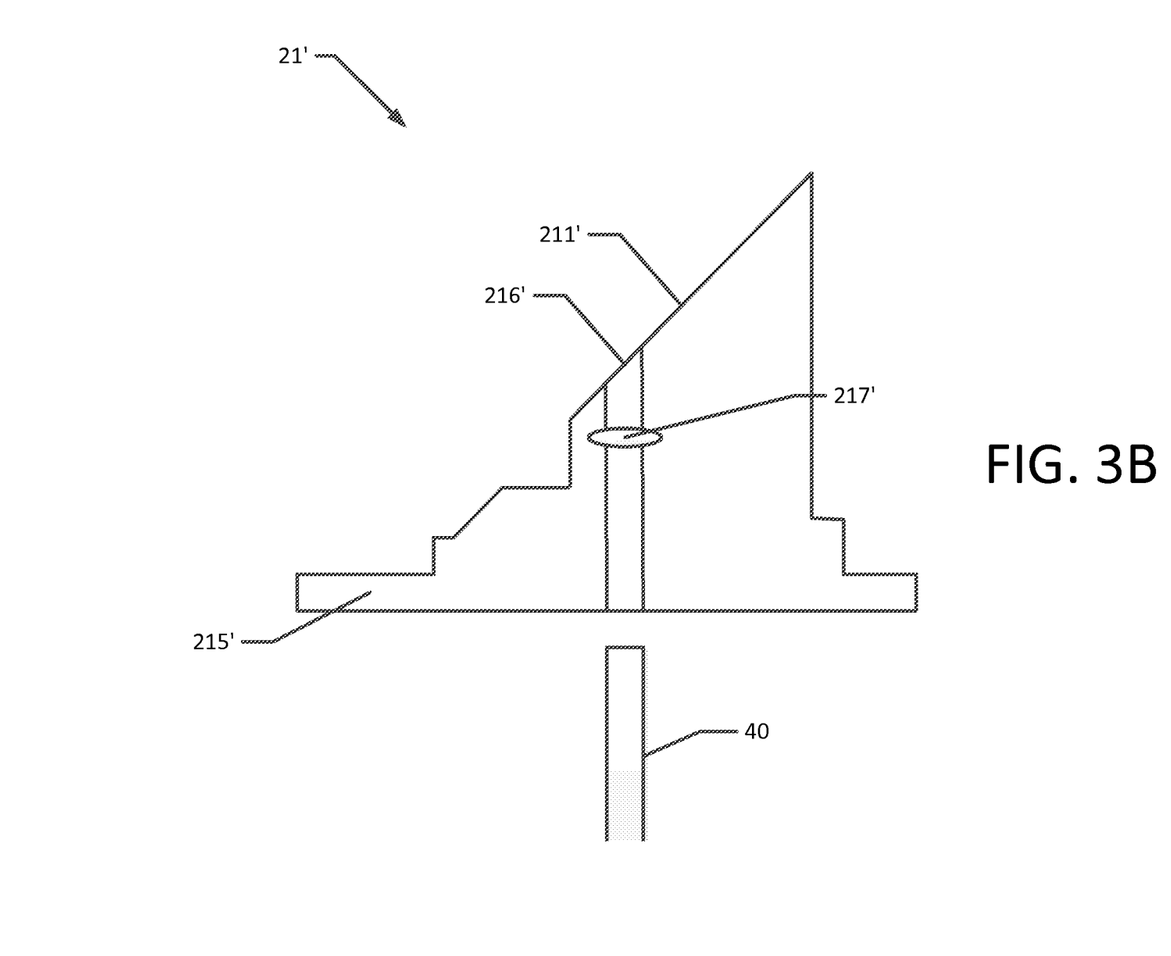

FIG. 3B illustrates another embodiment of a fiber-optic feed 21'. The fiber-optic feed 21' comprises a mirror substrate 215', a mirrored surface 211', a hole in the mirrored surface 216', and an optical relay 217' configured to re-image the hole 216' onto the cross section of optical fiber 40. In the embodiment illustrated in FIG. 3B, the mirror hole 216' matches the core size of the optical fiber 40. Thus, the embodiment illustrated in FIG. 3B may provide a larger portion of the beam 1 to the acquisition and guidance system camera 31 while still feeding the target source image to the optical fiber 40. Similar to as noted above, in some embodiments, the mirror substrate 215' is metal (e.g., aluminum) or made of a polymeric material (e.g., plastic) with an optical-quality (e.g., diamond-turned with sputtered aluminum coating) mirrored surface 211' large enough to accommodate the entire acquisition and guidance system field of view through the telescope. The mirror substrate 215' may be a printed by a 3D printer, machined from a single piece, or manufactured via another acceptable method.

In various embodiments, a second fiber-optic feed may also be incorporated into the fiber-optic feed 21, 21'. For example, a second optical fiber may be embedded into the mirrored surface 211, 211' slightly off center (e.g., 100 microns off center or the like). The second optical fiber may supply the off-center beam to a second switchable multi-fiber coupler. Analysis of the off-center beam captured by the second optical fiber may be used for analysis of background light, background subtraction, and/or the like. In various embodiments, the optical fiber 40 may be polymicro silica/silica fiber assembly.

The portion of the beam 1 that is not captured by the optical fiber 212 or hole 216' (and/or optional secondary optical fiber) is reflected from the mirrored surface 211, 211' and provided to the Hartman mirror array 24 via optical components (e.g., collimator lens 22 and mirror 23) as shown in FIG. 2. The Hartmann mirror array 24 is configured to provide a shifted, simultaneous image of the target source to the acquisition and guidance system. The shifted simultaneous image of the target source may be focused onto the focal plane of the acquisition and guidance system camera 31 by camera lens 32.

The Hartmann mirror array 24 includes two tilted flat mirrors. The mirrors are tilted at a small angle with respect to each other (e.g., 1 degree or so). This tilt produces two simultaneous images that are slightly shifted with respect to one another. The two images are captured side-by-side by the acquisition and guidance system camera 31. For example, if the mirrors are tilted by approximately 1 degree (approximately 179 degrees between the faces of the mirrors), the offset of the two images as captured by the acquisition and guidance system camera 31 will be approximately 320 pixels. The offset of the two images may be used to determine focus and/or pointing/tracking changes that need to be made in the operation of the telescope 10.

In various embodiments, the acquisition and guidance system camera 31 may comprise a charge-coupled device (CCD) detector, and/or other components. For example, in one embodiment, the acquisition and guidance system camera 31 is a Imaging Source DMK 21 AU system with a 640×480-pixel CCD. The acquisition and guidance system may be configured to provide feedback to the telescope control system 30 (e.g., 30A-30G) regarding focus and movement within the field of view of the target source based on the shift of the two received images. For example, the acquisition and guidance system camera 31 provides the captured images to the telescope control system 30, which may analyze the captured images to determine focus and/or pointing/tracking changes that need to be made in the operation of the telescope 10. For example, the differential motion of the two captured images may be used to monitor the telescope focus with respect to the target source. Also, synchronized movement of the two captured images indicates a pointing/tracking offset of the target source.

In one embodiment, the functions of the fiber-optic feed 21 and Hartmann mirror array 24 may be accomplished by a single optical component. For example, a combined fiber-optic feed Hartmann mirror array may be configured to provide a portion of a beam (e.g., the portion of the beam carrying the image of the target source) to an optical fiber 40 (e.g., 40A-40G) and provide the shifted simultaneous images to the acquisition and guidance system camera 31. Such a combined fiber-optic feed Hartman mirror array may be 3D printed or manufactured in some other appropriate way. In such an embodiment, the focal plane package may comprise a microfocuser, combined fiber-optic feed Hartmann mirror array and the acquisition and guidance system camera 31.

In various embodiments, the focal plane package may be configured to be deployed directly on a telescope 10 (e.g., 10A-10G). For example, the focal plane package may be configured to be directly connected to the output of a telescope 10 (e.g., in place of the eye piece lens, secured about the eye piece lens holder in addition the eyepiece, and/or the like).

C. Telescope Control System 30

In general, the term system may refer to, for example, one or more computers, computing devices, computing entities, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions, operations, and/or processes described herein. For example, the telescope control system 30 (e.g., 30A-30G) may be a Linux device such as a Raspberry Pi-B or other device. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. For example, the telescope control system 30 may be configured to receive captured image data from the acquisition and guidance system camera 31, analyze the captured image data to determine the focus and/or tracking/pointing status, control the telescope focus and/or tracking/pointing as needed, and/or the like.

As indicated, in one embodiment, the telescope control system 30 may also include one or more communications interfaces for communicating with various computing entities, such as by communicating data, content, information, and/or similar terms used herein interchangeably that can be transmitted, received, operated on, processed, displayed, stored, and/or the like. For instance, the telescope control system 30 may communicate with the array control system 200.

Figure 4:
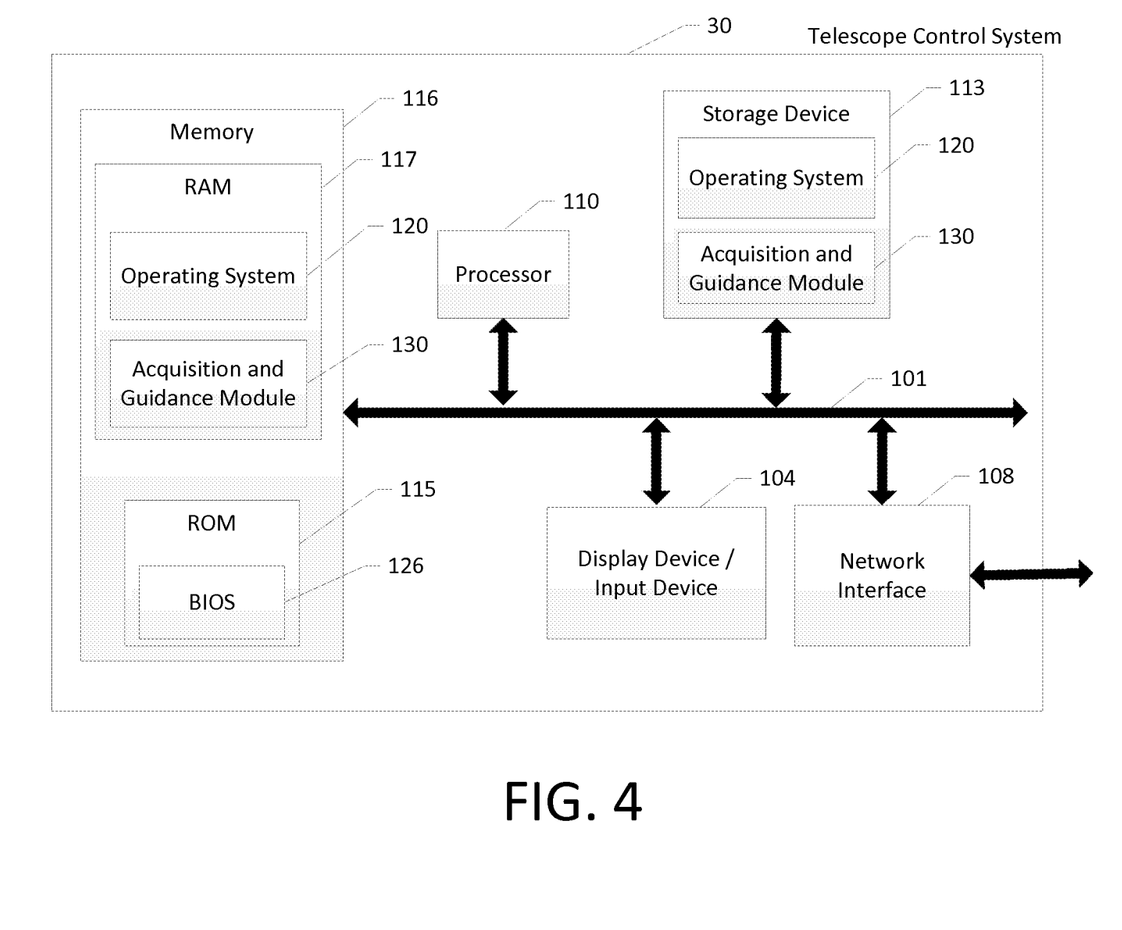
FIG. 4 is a schematic diagram of a telescope control system, in accordance with an embodiment of the present invention.

A schematic diagram of an example telescope control system 30 (e.g., 30A-30G) is illustrated in FIG. 4. In various embodiments, all of the telescope control systems 30 within a module 100 will be identical. In other embodiments, the telescope control systems 30 of a module 100 may not be identical. In the illustrated embodiment, the telescope control system 30 may include or be in communication with one or more processing elements 110 (also referred to as processors, processing circuitry, and/or similar terms used herein interchangeably) that communicate with other elements within the bank system via a bus, for example. As will be understood, the processing element 110 may be embodied in a number of different ways. For example, the processing element may be embodied as one or more complex programmable logic devices (CPLDs), microprocessors, multi-core processors, coprocessing entities, application-specific instruction-set processors (ASIPs), and/or controllers. Further, the processing element 110 may be embodied as one or more other processing devices or circuitry. The term circuitry may refer to an entirely hardware embodiment or a combination of hardware and computer program products. Thus, the processing element 110 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 110 may be configured for a particular use or configured to execute instructions stored in volatile or non-volatile media or otherwise accessible to the processing element. As such, whether configured by hardware or computer program products, or by a combination thereof, the processing element 110 may be capable of performing steps or operations according to embodiments of the present invention when configured accordingly.

The telescope control system 30 further includes memory 116, which may comprise non-volatile media (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. In various embodiments, memory 116 includes both read only memory (ROM) 115 and random access memory (RAM) 117. As will be recognized, the non-volatile storage or memory media may store databases, database instances, database management systems, data, applications, programs, program modules, scripts, source code, object code, byte code, compiled code, interpreted code, machine code, executable instructions, and/or the like. Such code may include the acquisition and guidance module 130. The term database, database instance, database management system, and/or similar terms used herein interchangeably may refer to a structured collection of records or data that is stored in a computer-readable storage medium, such as via a relational database, hierarchical database, and/or network database.

In at least one embodiment, the telescope control system 30 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 110. Thus, the databases, database instances, database management systems, data, applications, programs, program modules, scripts, source code, object code, byte code, compiled code, interpreted code, machine code, executable instructions, and/or the like may be used to control certain aspects of the operation of the telescope control system 30 with the assistance of the processing element 110 and operating system 120, such as the acquisition and guidance module 130.

In various embodiments, memory 116 can be considered primary memory such as RAM memory or other forms which retain the contents only during operation, or it may be a non-volatile memory, such as ROM, EPROM, EEPROM, FLASH, or other types of memory that retain the memory contents. In some embodiments, the disk storage may communicate with the processing element 110 using an I/O bus instead of a dedicated bus 101. The memory 116 could also be secondary memory, such as disk storage, that stores a relatively large amount of data. The secondary memory may be a floppy disk, hard disk, compact disk, DVD, or any other type of mass storage type known to those skilled in the computer arts. The memory may also comprise any application program interface, system, libraries and any other data by the processor to carry out its functions. ROM 115 is used to store a basic input/output system 126 (BIOS), containing the basic routines that help to transfer information between components of the telescope control system 30, including the acquisition and guidance module 130 and/or the operating system 120.

In addition, the telescope control system 30 includes at least one storage device 113, such as a hard disk drive, a floppy disk drive, a CD-ROM drive, or optical disk drive, for storing information on various computer-readable media, such as a hard disk, a removable magnetic disk, or a CD-ROM disk. As will be appreciated by one of ordinary skill in the art, each of these storage devices 113 is connected to the system bus 101 by an appropriate interface. It is important to note that the computer-readable media described above could be replaced by any other type of computer-readable media known in the art. Such media include, for example, memory sticks (e.g., USB memories), magnetic cassettes, flash memory cards, digital video disks, and Bernoulli cartridges.

A number of program modules may be stored by the various storage devices and within RAM 117. Such program modules include the operating system 120 and/or the acquisition and guidance module 130. Those skilled in the art will appreciate that other modules may be present in RAM 117 to effectuate the various embodiments of the present invention. Furthermore, rather than program modules, the acquisition and guidance module 130 may comprise stand-alone computers connectively coupled to the telescope control system 30.

Also located within the telescope control system 30 is a network interface 108, for interfacing and communicating with other elements of a computer network, such as by communicating data, content, information, and/or similar terms used herein interchangeably that can be transmitted, received, operated on, processed, displayed, stored, and/or the like. For instance, the telescope control system 30 may be in communication with one or more array control systems 200. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the telescope control system 30 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol.

Various information may be input by a user to the telescope control system 30 via the network interface 108 and/or input/output device 104 (e.g., via the array control system 200). This input information may include information related to target sources to be observed, pointing/tracking information, or other information. This input information may vary, however, depending on the configuration and informational requirements of the telescope control system 30.

As mentioned above, the telescope control system 30 also includes an input/output device 104 for receiving and displaying data. The telescope control system 30 may include or be in communication with one or more input elements, such as a keyboard input, a mouse input, a touch screen/display input, audio input, pointing device input, joystick input, keypad input, CCD detector (e.g., 31), and/or the like, as indicated by input/output device 104. The telescope control system 30 may also include or be in communication with one or more output elements, as indicated by input/output device 104, such as audio output, video output, screen/display output, motion output, movement output, and/or the like. For example, the telescope control system 30 may receive input from the CCD detector in the form of captured image data and provide output in the form adjusting the focus and/or pointing/tracking of the telescope 10.

The telescope control system 30 is configured to control one or more telescopes 10. For example, telescope control system 30A controls telescope 10A by, for example, adjusting the focus and/or pointing of the telescope. The telescope control system 30 may further be configured to provide and/or receive information from the array control system 200. Those skilled in the art will recognize that many other alternatives and architectures are possible and can be used to practice various embodiments of the invention. The embodiment illustrated in FIG. 4 can be modified in different ways or incorporated within a network and be within the scope of the invention. For example, one or more components of the telescope control system 30 may be located remotely from other telescope control system 30 components, such as in a distributed system. Furthermore, one or more of the components may be combined and additional components performing functions describe herein may be included in the telescope control system 30. Thus, the telescope control system 30 can be adapted to accommodate a variety of needs and circumstances. The telescope control systems 30A-30G may be configured such that each telescope is independently and/or autonomously operated for tracking and/or focus control.

D. Array Control System 200

In one embodiment, the array control system 200 may include one or more components that are functionally similar to those of the telescope control system 30. For example, in one embodiment, the array control system 200 may include one or more processing elements, one or more display device/input devices, volatile and non-volatile storage or memory, and/or one or more communications interfaces. The array control system 200 may also comprise various other systems, such as a library of possible target sources and/or a variety of other systems and their corresponding components. In particular, the array control system 200 may include components configured to receive, store, and/or analyze data captured via the scientific detect unit or the power meter 90, store information regarding a pointing/tracking for the current, past and/or future observations, and/or the like. The array control system 200 may be located remotely from at least a portion of the telescope array and may be configured to communicate with one or more telescope control systems 30A-30G, and/or other computing devices, via a wired or wireless network.

E. Switchable Multi-Fiber Coupler 80

In various embodiments, a switchable multi-fiber coupler 80 is configured to receive the input beams from a module of telescopes, combine the captured beams into a combined beam, and output the combined beam in accordance with a selected output option. The input beam may be the beam captured by the optic-fiber feed 21 or the combined beam of a sub-array. In various embodiments, two, three, or more output options may be selected by a user, the array control system 200, and/or the like.

In one embodiment, the switchable multi-fiber coupler 80 comprises a collimator/camera optical relay with mechanically-selectable fold mirrors. The mechanically-selectable fold mirrors allow an output option to be selected. The switchable multi-fiber coupler 80 illustrated in FIG. 1 is configured to provide three output options. In other embodiments, additional output options may be provided or fewer output options may be provided. If output option O1 is selected via the switchable multi-fiber coupler 80, the combined beam is provided to the next level. For example, if output option O1 is selected, the switchable multi-fiber coupler 80 will provide the combined beam to another switchable multi-fiber coupler configured to couple the combined beams from multiple (e.g., seven) modules into a super-combined beam. If output option O2 is selected via the switchable multi-fiber coupler 80, the combined beam is provided to a scientific detector unit (e.g., a spectrograph, a high time-resolution detector, polarimeter, and/or other detector unit). If output option O3 is selected via the switchable multi-fiber coupler 80, the combined beam is provided to power meter 90. The power meter 90 may measure the power, lumens, radiant flux, and/or the like. The power meter 90 may then communicate the measured quantity to the array control system 200.

Figure 5:
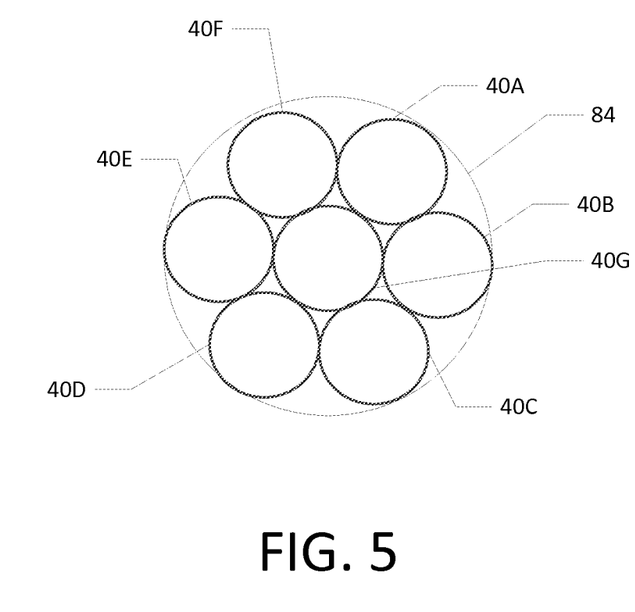
FIG. 5 illustrates an example arrangement of the optical fibers that may be used in accordance with an embodiment of the present invention.

With reference now to FIG. 5, in various embodiments, the optical fibers providing the beam from the individual telescopes may be provided to the switchable multi-fiber coupler such that maximum packing density for fiber bundles in the range of 5-10 fibers maybe achieved. For example, the fiber optic cables 40A-40G connecting the focal plan packages 20A-20G to the switchable multi-fiber coupler 80 may be provided to the switchable multi-fiber coupler in a hexapack arrangement, as shown in FIG. 5. The relative size of optical fiber 84, which provides the combined beam to the science detector unit, to the optical fibers 40A-40G which carry the beams from the individual telescopes is also shown in FIG. 5 for an example embodiment. In various embodiments, the optical fiber that provides the combined beam to the power meter 90 or another switchable multi-fiber coupler 80 may be similar in size to optical fiber 84.

In various embodiments, it is important to tune the magnification experienced by the input beams provided to the switchable multi-fiber coupler 80 via the bundle of fiber optic cables 40A-40G and/or the combined beam output by the switchable multi-fiber coupler 80. This may, for example, allow the system magnification to be tuned as appropriate to match the numerical aperture of the module, array, or sub-array that captured/collected the incoming beam and the diameter of the output optic fibers 84. For example, the input fiber bundle shown in FIG. 5 includes seven optical fibers 40A-40G matched to a single 100 micrometer output optical fiber 84. In an example embodiment, the optical fibers 40A-40G may carry an output beam with a focal ratio of f/9 (due to focal ratio degradation of the telescope f/10 beam) and the output optical fiber 84 may transmit a f/4.7 beam.

Figure 6:
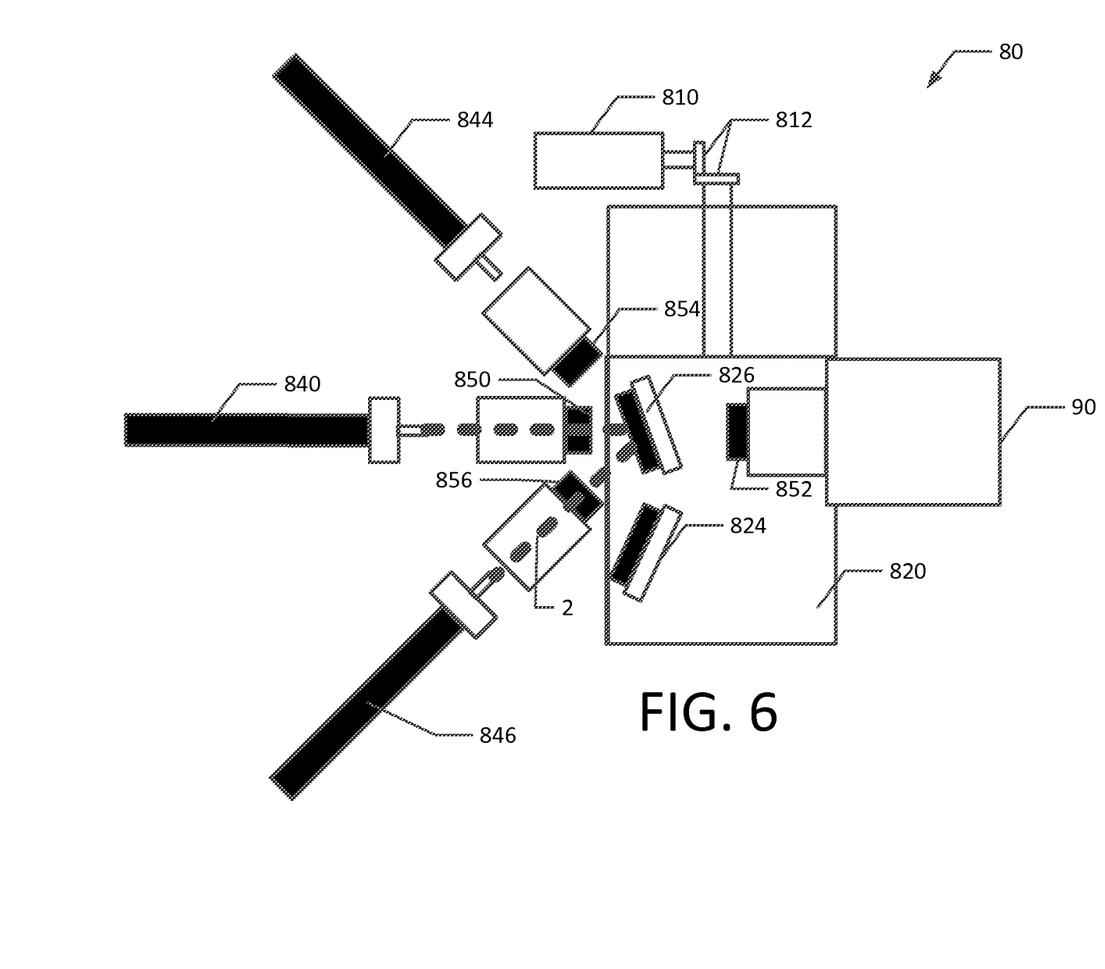
FIG. 6 illustrates an example embodiment of a switchable multi-fiber coupler in accordance with an embodiment of the present invention.

FIG. 6 illustrates an example embodiment of a switchable multi-fiber coupler 80. Input fiber bundle 840 is made up of the optical fibers 40A-40G, each carrying the beam captured by the corresponding fiber-optic feed 21 (e.g., comprising a source image). The beams enter the switchable multi-fiber coupler 80 via collimator lens 850. The switchable multi-fiber coupler 80 comprises platform 820 having switch fold mirrors 824, 826 secured thereto and a means for moving platform 820 into predefined positions corresponding to a selection of an output option. In the illustrated embodiment, stepper motor 810 and gears 812 are configured to move the platform 820 into a selected one of three predefined positions, each position corresponding to an output option. As illustrated, the switchable multi-fiber coupler 80 is in the position corresponding to output option O3. Thus, the combined beam 2 enters the switchable multi-fiber coupler 80 via the collimator lens 850 and is reflected off of switch fold mirror 826. The combined beam 2 (e.g., comprising the coupled/combined source images) is reflected off of the switch fold mirror 826 toward reimaging lens 856. After passing through the reimaging lens 856, the combined beam 2 is passed to output optical fiber 846. The output optical fiber 846 is configured to provide the combined beam 2 to a scientific detector unit.

As appropriate, the stepper motor 810 and gears 812 may be used to move the platform 820 into a predefined position corresponding to output option O2. For example, the combined beam 2 may pass through the collimator lens 850, pass between the switch fold mirrors 824 and 826, pass through reimaging lens 852 and be provided to the power meter 90. For example, the power meter 90 may use a charge-coupled device (CCD) detector to measure the power of combined beam 2.

As appropriate, the stepper motor 810 and gears 812 may be used to move the platform 820 into a predefined position corresponding to output option O1. For example, the combined beam 2 may pass through the collimator lens 850, be reflected by the switch fold mirrors 824, pass through reimaging lens 854 and be provided to the output optical fiber 844. The output optical fiber 844 may be configured to provide the combined beam 2 to the next level of the telescope array.

It should be understood that the switchable multi-fiber coupler 80 illustrated in FIG. 6 illustrates an example embodiment of a switchable multi-fiber coupler. For example, in another embodiment, the switchable multi-fiber coupler may comprise four predefined positions, each corresponding to one of four output options, and the corresponding optical equipment. For example, such a switchable multi-fiber coupler may be configured to provide the combined beam to the next level of the array, a power meter, a spectrograph, and a high time resolution detector. In another example, the platform 820 may be manually moved between the predefined positions, rather than the illustrated stepper motor and corresponding gears shown in FIG. 6.

F. Scientific Detector Unit

In general, a telescope array as described herein may be used for a variety of applications. For example, the telescope array may be used with one or more scientific detector units configured for transient spectroscopy and/or synoptic monitoring spectroscopy, precision radial velocity measurements (including redshift drift), spectropolarimetry, time domain studies, atmospheric sensing (e.g., LiDAR studies), and satellite spectroscopy, polarimetry, and laser ranging for intelligence applications. In particular, the scientific detector unit is configured to receive the combined beam and perform one or more measurements thereon. For example, the scientific detector unit may be a spectrograph detector unit, a high time-resolution detector unit, a polarimetry detector, and/or the like.

In various embodiments, a standard fiber-fed spectrograph may be used with the photonic-synthesis array. Each of the science input fibers from the photonic-synthesis array may be arranged in a line to form a pseudo-longslit spectrograph input focal plane—a standard arrangement for astronomical spectrographs. A key difference between the photonic-synthesis array input and that for standard astronomical spectrographs is that different "levels" of the array have different fiber diameters and numerical apertures, as will be described in detail below herein; these parameters are usually consistent between fiber inputs for standard spectrographs. Thus, when using the photonic synthesis array input, the minimum numerical aperture (fastest optical beam speed) of all the inputs sets the minimum pupil diameter for the spectrograph. Meanwhile, the smallest fiber diameter sets the effective system magnification, in that the pixel sampling should Nyquist-sample the smallest fiber. Thus, smaller fibers with slower beam speeds will underfill the pupil (and thus the dispersing grating element) of the spectrograph. Meanwhile, the larger fibers will typically be oversampled on the CCD focal plane of the spectrograph unit.

Table 1 provides example spectrograph numerology for some example embodiments of a telescope array. For example, the signal from a level 1 telescope array (e.g., a module of seven individual telescopes) having an equivalent aperture diameter of 0.9 meters may be provided as input to a spectrograph having a pupil size of 108 nanometers and a grating with a density of 1800 lines per millimeter, the resulting spectral resolution at about 550 nanometers is 6720 and the pixel sampling of the spectrograph will be approximately 2.1. By combining, for example, seven modules into a level 2 telescope array by combining the image data gathered by each module (e.g., via a switchable multi-fiber coupler 80), the equivalent aperture of the telescope if 2.5 meters. If the level 2 telescope array image data is provided to a spectrograph having a pupil size of 127 nanometers and a grating density of 1800 lines per millimeter, the resulting spectral resolution if 2240 around 550 nanometers and a pixel sampling of 6.2. The numerical aperture (e.g., optical beam speed) of the array dictates the pupil diameter for the spectrograph and the fiber diameter determines the effective system magnification. If fibers from different levels of an array are provided to the spectrograph, the minimum numerical aperture of all the inputs sets the minimum pupil diameter and the smallest fiber diameter sets the effective system magnification. Thus, it should be understood that in some applications, it may be preferred to provide the input to the spectrograph from each individual telescope or module and in other applications it may be preferred to provide the input to the spectrograph as a combined signal (e.g., via a switchable multi-fiber coupler 80) to take advantage of the differences in numerical aperture and fiber diameter of the different levels of the telescope array.

TABLE 1

| Level | Equivalent Aperture Diameter (m) | Wavelength (nm) | Pupil Size (nm) | Grating Density (1/mm) | Spectral Resolution ($\lambda/\Delta\lambda$) | Pixel Sampling |
| --- | --- | --- | --- | --- | --- | --- |
| 1 | 0.9 | 550 | 108 | 1800 | 6720 | 2.1 |
| 2 | 2.5 | 550 | 127 | 1800 | 2240 | 6.2 |
| 3 | 6.6 | 550 | 200 | 1800 | 1120 | 12.3 |

In another example, the science detector unit may be a high time-resolution detector. Generally used high time-resolution detectors include photomultiplier tubes (PMTs), avalanche photodiodes (APDs), or other non-imaging devices with time resolutions less than or on the order of 1-14 milliseconds. If a high time-resolution detector is to be used, the final output fiber may be directly mated to the detector surface. With typical sensitive region dimensions on the order of ~1-mm or greater, any of the fiber outputs described above can be placed close to the detector surface (e.g., within approximately 100 micrometers of the detector surface), so the light that passes through the optical fiber may be detected by the detector. In various embodiments, a single high-speed detector (e.g., PMT or APD) may be used to detect the light from each fiber output. However, the light encountering a given detector does not have a common light travel path length from the source to the detector. For example, a 7-pack module may have a diameter of be approximately 3-meters, corresponding to a light travel time of <10-nanoseconds from one side to the other, depending on the pointing direction of the telescopes. Extrapolating this example to a 42 meter equivalent aperture, the footprint may be approximately 60 meters, leading to an effective light travel delay of approximately 100 nanoseconds. Thus, in some embodiments, a switchable fiber delay line may be incorporated, for example using a pair of fiber switches linked by variable length delay lines, to achieve variable relative time delays to correct the light time-of-flight delay between different telescopes/modules. As the array tracks a target across the sky, the control system 200 can divert the light from the various switches to selected delay lines (e.g., optical fibers with lengths ranging from less than one meter up to approximately half the array diameter, or 30 meters for the 42 meter aperture example) and back to the normal light flow in the array.

In various embodiments, the science detector unit may a polarimetry detector (e.g., a detector configured for spectropolarimetry or time-resolved polarimetry). In embodiments using a polarimetry detector, polarization-maintaining fibers may be used throughout the photonic-synthesis array to preserve the polarization as the beam travels to the science detector unit. In other embodiments that may be used for polarimetry applications, the fiber-optic feed 21 in each acquisition and guidance system 20 may be replaced with a polarization modulation/splitting unit. For example, an optical relay with polarizing retarders and a polarizing beam splitter (e.g., a Wollaston prism or a Glan-Thompson polarizer) may be used to feed the incoming polarization-split beam into two separate, standard multi-mode fibers. In such embodiments, the polarization separation happens "upstream" of the optical fibers 40, so the polarization-maintaining properties of the optical fibers 40 become irrelevant. This photonic approach then allows the two optical fibers to follow the same path for a "standard" photonic-synthesis array to the science detector unit. In such an embodiment, the science detector unit itself need not perform a polarization analysis. Rather, the intensities of the two separate fiber channels, combined with the polarizing retarder configuration at each telescope, combine to provide the full polarized light information.

In another embodiment, the optical fibers from multiple arrays may be used as combined inputs for effectively producing extremely larger-aperture arrays. For example, two or more fiber inputs, each fiber input from an array, may be provided to a science detector as from a single fiber input. Thus, in some embodiments, multiple arrays may be used in parallel as inputs into the same science detector unit side-by-side or may be separately provided to separate science detector units operated in parallel.

II. Multiple Module Architecture

In various embodiments, multiple modules may be combined to create a larger aperture telescope array. For example, seven modules may be combined to create a telescope array or a super-module. In such an example, each of the seven modules is similar to module 100 illustrated in FIG. 1. In some embodiments, each module may include a module control system similar to the array control system 200 in addition to the array control system 200. In embodiments, the array control system 200 is configured to communicate with the telescope control systems 30 of each of the telescopes 10 in each of the modules. When output option O1 is selected via each the switchable multi-fiber coupler 80 of each of the modules, the combined beam from each module is provided to an additional switchable multi-fiber coupler 80 configured to combine the combined beams into a super combined beam.

In embodiments where an even larger aperture telescope is desired, super-modules may be combined to form the telescope array. For example, each module may comprise seven telescopes and each super-module may comprise seven modules. The super-modules may be combined into a telescope array in a similar fashion as described above for combining modules into super-modules.

Table 2 provides an example of how the multi-telescope array may scale as levels are added to the array. For example, level 0 is a single telescope having an aperture diameter of 0.36 meters. Level 1 may be a module of seven individual telescopes, each telescope having an aperture diameter of 0.36 meters. By combining the image data captured by each of the seven individual telescopes of the level 1 array with a switchable multi-fiber coupler 80 as described elsewhere herein, the level 1 array has an equivalent aperture diameter of 0.94 meters. Seven level 1 arrays may then be combined into a level 2 array via a switchable multi-fiber coupler 80. The level array, in this example embodiment, has an equivalent aperture diameter of 2.5 meters. As the level of the array increases, the diameter of the optical fiber bundle 840 (e.g., 40A-40G) provided as input to the switchable multi-fiber coupler 80 and the diameter of the output optical fiber 84 (e.g., 844, 846) both increase.

TABLE 2

| Level | Number of Fibers | Input Bundle Diameter (μm) | Input Numerical Aperture | Output Fiber Diameter (μm) | Equivalent Aperture Diameter (m) |
|---|---|---|---|---|---|
| 0 | 1 | 25.0 | 0.050 | 25 | 0.36 |
| 1 | 7 | 122.1 | 0.066 | 100 | 0.94 |
| 2 | 7 | 325.7 | 0.078 | 300 | 2.5 |
| 3 | 7 | 868.6 | 0.123 | 600 | 6.6 |
| 4 | 7 | 1683 | 0.225 | 1000 | 17.4 |

It should be understood that by coupling individual telescopes into modules and combining modules into super-modules, an array of considerable equivalent aperture diameter may be built. Also, as noted elsewhere herein a set of level 1 arrays, for example, may be operated as distinct arrays operating with a common, shared detection system or may be operated as a level 2 array. This switching approach allows the dynamic reconfiguration of the system on time scales of approximately 10 seconds from a single large aperture telescope array to multiple, independently-operable smaller aperture telescope arrays.

III. System Operation

Figure 7:
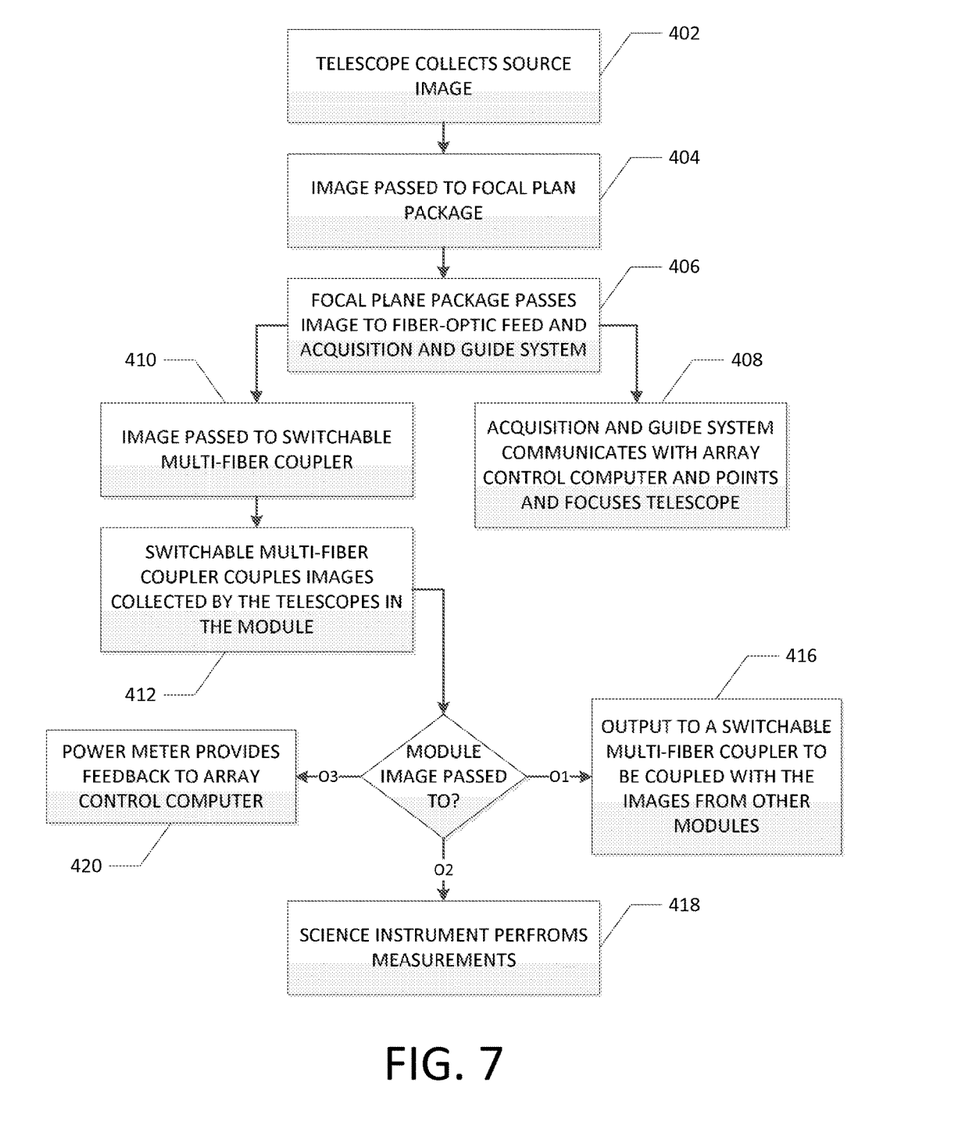
FIG. 7 is a flowchart illustrating operations and processes performed in accordance with an embodiment of the present invention.

FIG. 7 provides a flowchart illustrating various processes performed in one embodiment of the method of the photonic synthesis of a large aperture telescope from a multi-telescope array. The numbers 10, 20, 30, etc. herein refer to single unit embodiments and arrays, such as those illustrated in FIG. 1. For example, telescope 10 may be any of telescopes 10A-10G illustrated in FIG. 1.

At step 402, the individual telescopes 10 each collect an image of the source. For example, each individual telescope 10 is pointed at the source target such that photons from the source target are collected by each of the individual telescopes. At step 404, the source image from each telescope 10 of the array is passed to the focal plane package 20 associated with that telescope. At step 406 the focal plane package 20 provides a source image to an optical fiber (e.g., via fiber-optic feed 21) and the acquisition and guidance system. At least a portion of the acquisition and guidance system may be a sub-system of the telescope control system 30. As noted above, the source image may be passed to the acquisition and guidance system as shifted simultaneous images (e.g., by Hartmann mirror array 24) incident on the acquisition and guidance system camera 31 (e.g., a CCD detector). The shift between the simultaneous source images may be used to adjust focus and tracking parameters for the individual telescope 10. At step 408, the acquisition and guidance system and/or other sub-system of the telescope control system 30 communicates with the array control system 200. The focus and/or tracking parameters for the individual telescope may be adjusted by the telescope control system 30 based on the detected shift of and/or between the two simultaneous source images and the communication with the array control system 200.

At step 410, optical fibers are used to pass a source image from each telescope 10 in the module 100 to a switchable multi-fiber coupler 80. At step 412, the switchable multi-fiber coupler 80 couples and/or combines the source images provided by each telescope 10 in the module 100 into a single optical fiber 84. At step 416, if the first output option O1 of the switchable multi-fiber coupler 80 is selected, the coupled source images are provided to another multi-fiber coupler configured to couple and/or combine source images from modules 100 within the array or super-module. At step 418, if the second output option O2 of the switchable multi-fiber coupler 80 is selected, the coupled source images are provided to at least one science instrument configured to perform scientific measurements on the provided coupled source images. At step 420, if the third output option O3 of the switchable multi-fiber coupler 80 is selected, the coupled source images are provided to a power meter 90 configured to measure the power carried by the coupled source images. The power meter 90 may then provide feedback to the array control system 200 based on the measured power of the coupled source images. It should be appreciated that a variety of other processes and/or operations may be completed in accordance with other embodiments of the present invention. Additionally, in other embodiments, not all of the processes discussed herein may be completed.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A switchable multi-fiber coupler comprising:
   a bundle of input optical fibers, wherein (a) the bundle of input optical fibers comprises a plurality of input optical fibers and (b) each of the input optical fibers is configured to provide an input signal;
   at least two output optical fibers each configured to provide an output signal, wherein a diameter of each output optical fiber of the at least two output optical fibers is approximately the same as or larger than a width of the bundle of input optical fibers; and
   at least one optical component configured to (a) couple the signal from each input optical fiber of the bundle of input optical fibers into one output signal and (b) to selectably provide the output signal to at least one of the output optical fibers, wherein the at least one optical component comprises at least one mirror.

2. The apparatus of claim 1 wherein the at least one optical component comprises two or more mirrors fixed with respect to each other and moveably with respect to the input optical fiber and the at least two optical fibers.

3. The apparatus of claim 1 wherein the at least one optical component is secured to a platform moveable between at least two defined positions, each position configured to provide the output signal to a corresponding one of the at least two output optical fibers.

4. A focal plane package comprising:
   an optical fiber feed configured to provide a first portion of an optical signal to an optical fiber; and
   a mirror array configured to provide two shifted simultaneous signals to an image capture device, the two shifted simultaneous signals being a second part of the optical signal, the second part of the optical signal being separate and distinct from the first part of the optical signal, and the two shifted simultaneous signals being shifted relative to one another.

5. The system of claim 4 wherein the mirror array comprises two flat mirrors tilted with respect to each other.

6. The system of claim 5 wherein the two flat mirrors are tilted with respect to each other by approximately 1 degree.

7. The system of claim 4 wherein the image capture device is a CCD camera in communication with a telescope control system.

8. The system of claim 7 wherein the telescope control system is configured to control at least one of the focus or the tracking of a telescope based at least in part on the shift between the two shifted simultaneous signals.

9. The system of claims 4 wherein the optical fiber feed comprises an optical fiber embedded in a mirror such that a cross-section of the optical fiber is embedded in the surface of the mirror.

10. The system of claim 9 wherein the optical fiber is embedded in the mirror such that an image portion of the signal is provided to the optical fiber.

11. The system of claim 9 wherein the optical fiber feed comprises a second optical fiber embedded in the mirror such that the cross-section of the second optical fiber is embedded in the surface of the mirror.

12. The system of claim 11 wherein the second optical fiber is embedded in the mirror approximately 100 microns from the optical fiber.

13. The system of claims 4, wherein the an optical fiber feed configured to provide an optical signal to an optical fiber is embedded in the mirror array configured to provide two shifted simultaneous signals to the image capture device such that a cross-section of the optical fiber is embedded in the surface of the mirror array.

14. A telescope array comprising:
   a plurality of telescopes, each telescope associated with (a) a focal plane package, each focal plane package comprising (i) an optical fiber feed configured to provide a first portion of an optical signal to an optical fiber and (ii) a mirror array configured to provide two shifted simultaneous signals to an image capture device, the two shifted simultaneous signals being at least a part of a second portion of the optical signal, and (b) a telescope control system configured to control the focus and tracking of the telescope, such that each telescope may be independently focused and pointed;
   at least one switchable multi-fiber coupler configured to couple the signals of at least some of the plurality of telescopes, the switchable multi-fiber coupler comprising (i) a bundle of input optical fibers, wherein the bundle of input optical fibers comprises a plurality of input optical fibers and each of the input optical fibers is configured to provide an input signal, (ii) at least two output optical fibers each configured to provide an output signal, and (iii) at least one optical component configured to couple the signal from each input optical fiber of the plurality of input optical fibers into one output signal and to selectably provide the output signal to at least one of the output optical fibers; and
   an array control system in communication with each of the telescope control systems.

15. The telescope array of claim 14 wherein the plurality of telescopes comprises seven telescopes.

16. The telescope array of claim 14 wherein the pluralities of telescopes are organized into modules each comprising seven telescopes.

17. The telescope of claim 16 wherein each module is associated with a switchable multi-fiber coupler.

18. The telescope array of claim 17 wherein the optical fibers associated with each telescope in a module are provided to the switchable multi-fiber coupler in a hexapack formation.

19. A method for coupling a plurality of telescopes into telescope array the method comprising:
   providing a plurality of telescopes wherein each telescope is associated with a focal plane package, each focal plane package comprising (i) an optical fiber feed configured to provide a an optical signal to an optical fiber and (ii) a mirror array configured to provide two shifted simultaneous signals to an image capture device and a telescope control system configured to control the focus and tracking of the telescope, such that each telescope may be independently focused and pointed; and
   coupling the signal from at least some of the telescopes via a switchable multi-fiber coupler, the switchable multi-fiber coupler comprising (i) a bundle of input optical fibers, each of the input optical fibers configured to provide an input signal, each input optical fiber associated with one of the plurality of telescopes, (ii) at least two output optical fibers each configured to provide an output signal, and (iii) at least one optical component configured to couple the signal from each input optical fiber into one output signal and to selectably provide the output signal to at least one of the output optical fibers.

20. The method of claim 19 further comprising passing the coupled signal to a scientific instrument.

21. The method of claim 19 wherein the plurality of telescopes are organized into modules.

22. The method of claim 21 wherein each module comprises seven telescopes.

23. The method of claim 21 wherein each module is associated with a switchable multi-fiber coupler.

* * * * *

UNITED STATES PATENT AND TRADEMARK OFFICE
CERTIFICATE OF CORRECTION

PATENT NO. : 9,995,882 B2
APPLICATION NO. : 15/109298
DATED : June 12, 2018
INVENTOR(S) : Eikenberry et al.

Page 1 of 1

It is certified that error appears in the above-identified patent and that said Letters Patent is hereby corrected as shown below:

On the Title Page

Item "( * ) Notice: Subject to any disclaimer, the term of this patent is extended or adjusted under 35 U.S.C. 154(b) by 0 days. days." should read --( * ) Notice: Subject to any disclaimer, the term of this patent is extended or adjusted under 35 U.S.C. 154(b) by 0 days.--

In the Claims

Column 16
Line 51, Claim 9 "The system of claims 4 wherein the optical fiber feed" should read --The system of claim 4 wherein the optical fiber feed--
Line 65, Claim 13 "The system of claims 4, wherein the an optical fiber" should read --The system of claim 4, wherein the optical fiber--

Signed and Sealed this
Thirteenth Day of November, 2018

Andrei Iancu
*Director of the United States Patent and Trademark Office*